United States Patent
Holmes et al.

(10) Patent No.: US 7,615,101 B2
(45) Date of Patent: Nov. 10, 2009

(54) HIGH ENERGY DISSOCIATION FOR MERCURY CONTROL SYSTEMS

(75) Inventors: Michael J. Holmes, Thompson, ND (US); John H Pavlish, East Grand Forks, MN (US); Edwin S. Olson, Grand Forks, ND (US); Ye Zhuang, Grand Forks, ND (US)

(73) Assignee: Energy & Environmental Research Foundation, Grand Forks, ND (US)

( * ) Notice: Subject to any disclaimer, the term of this patent is extended or adjusted under 35 U.S.C. 154(b) by 418 days.

(21) Appl. No.: 11/220,810

(22) Filed: Sep. 7, 2005

(65) Prior Publication Data

US 2007/0051239 A1 Mar. 8, 2007

(51) Int. Cl.
B01D 53/04 (2006.01)
B01D 53/64 (2006.01)
(52) U.S. Cl. .............. 95/107; 95/134; 96/150; 96/373; 110/203; 110/345
(58) Field of Classification Search ........... 95/90, 95/107, 134; 96/372, 373, 108, 150; 110/203, 110/345; 423/210, 462, 491, 503
See application file for complete search history.

(56) References Cited

U.S. PATENT DOCUMENTS

| | | | |
|---|---|---|---|
| 5,405,420 A | 4/1995 | Yang | |
| 6,447,740 B1 * | 9/2002 | Caldwell et al. | 423/210 |
| 6,808,692 B2 | 10/2004 | Oehr | |
| 6,855,859 B2 * | 2/2005 | Nolan et al. | 423/210.5 |
| 6,878,358 B2 | 4/2005 | Vosteen et al. | |
| 2003/0065236 A1 | 4/2003 | Vosteen et al. | |
| 2003/0161771 A1 * | 8/2003 | Oehr | 423/210 |
| 2003/0185718 A1 * | 10/2003 | Sellakumar | 422/171 |
| 2003/0235525 A1 * | 12/2003 | Honjo et al. | 423/210 |
| 2004/0003716 A1 * | 1/2004 | Nelson | 95/134 |
| 2004/0013589 A1 | 1/2004 | Vosteen et al. | |
| 2004/0069610 A1 * | 4/2004 | Arno et al. | 204/157.15 |
| 2004/0069613 A1 * | 4/2004 | Agnew et al. | 204/164 |
| 2004/0086439 A1 * | 5/2004 | Vosteen et al. | 423/210 |
| 2005/0036926 A1 * | 2/2005 | Lissanski et al. | 423/210 |
| 2006/0029531 A1 * | 2/2006 | Breen et al. | 423/210 |
| 2006/0048646 A1 * | 3/2006 | Olson et al. | 95/134 |
| 2007/0167309 A1 | 7/2007 | Olson | |
| 2007/0180990 A1 * | 8/2007 | Downs et al. | 95/134 |

FOREIGN PATENT DOCUMENTS

WO WO 2005/092477 6/2005

* cited by examiner

*Primary Examiner*—Frank M Lawrence
(74) *Attorney, Agent, or Firm*—Conley Rose, P.C.

(57) ABSTRACT

An apparatus and method for controlling mercury emissions in the gas stream from a fuel fired system includes a chamber for creating dissociated halogen to be supplied to the gas stream, with or without carbonaceous material.

34 Claims, 3 Drawing Sheets

Impact of quenched halogens on mercury oxidation and removal in pollutant control devices - TXU Lignites Impact of quenched halogens on mercury oxidation and removal in pollutant control devices - Subbituminous coal

HIGH ENERGY DISSOCIATION FOR MERCURY CONTROL SYSTEMS

GOVERNMENT INTEREST

This invention was made with U.S. Government support under agreement CR 830929-01 awarded by the U.S. Environmental Protection Agency. The government has certain rights in this invention.

FIELD AND BACKGROUND OF THE INVENTION

The present invention relates generally to the field of mercury emission control in coal-fired systems, and, in particular, to a new and useful control apparatus, method of operation and potential applications for the apparatus for the removal of mercury from flue gas where more effective removal of elemental mercury is obtained by oxidation with high-energy-dissociated halogens brought into contact with the flue gas, with or without the addition of sorbents such as carbon.

Mercury (Hg) emissions have become a health and environmental concern because of their toxicity and ability to bioaccumulate. The U.S. Environmental Protection Agency (EPA) has recently determined that regulation of Hg emissions from coal-fired electric power plants is necessary and appropriate. Recently enacted clean air regulation seek to phase in more stringent mercury emissions over the next several years, creating an urgent need to develop more effective mercury control technologies.

Mercury in flue gas can be captured by injection of sorbents such as carbon, which are removed by subsequent particulate collection devices. Although sorbent injection is, so far, the most mature control technology, the amount of sorbent needed to serve the U.S. market is expected to be large and economically burdensome to implement and maintain. There is a need to develop new methods to minimize changes required for utilities and to reduce costs associated with capital equipment and carbon injection.

Flue gas constituents, especially halogens or halides, can impact the fate and form of mercury in the flue gas. Naturally occurring chlorine in coals or halogen compounds that have been added to the fuel are converted in the furnace to the atomic form but, being highly reactive, react with flue gas components and each other to form more complex molecular forms. For example, when a halogen such as chlorine is used, reactions with water vapor, $SO_2$, and other flue gas components will occur and will form products such as HCl, $SO_2Cl_2$, and $Cl_2$. As the flue gas cools, reactions of atomic or molecular halogens with elemental mercury will also occur, but are limited depending on other competing reactions discussed above. Heterogeneous reactions with or on particulates can occur in addition to gas-phase reactions.

Reactions of atomic halogen species generated in the furnace are kinetically limited and heavily depend on temperature-time profile. The issue is the amount and form of halogen available for oxidation of $Hg^0$ in the gas phase, or for interaction on the surface of a sorbent.

Horne (Horne, D. G.; Gosavi, R.; Strausz, O. P. *J. Chem. Phys.* 1968, 48, 4758.) determined a rate constant for a Hg+Cl atom by measuring the formation of HgCl using a spectroscopic (279 nm) method for this product. The second-order rate constant for this Hg(I) species was about $1.3 \times 10^{-11}$ $cm^3$ $molecules^{-1}sec^{-1}$. This very fast reaction could be followed by a second reaction to form $HgCl_2$. Using indirect methods, Ariya (Ariya, P. A.; Khalizov, A.; Gidas, A. *J. Phys. Chem. A* 2002, 106, 7310) determined second-order rate constants for $Hg^0$ with halogen species as follows: with a Cl atom, $1.0 \times 10^{-11}$ $cm^3$ $molecules^{-1}sec^{-1}$; with a Br atom, $3.2 \times 10^{-12}$ $cm^3$ $molecules^{-1}sec^{-1}$; with $Br_2$, $9 \times 10^{-17}$ $cm^3$ molecules $sec^{-1}$; and with $Cl_2$, $2.6 \times 10^{-18}$ $cm^3$ $molecules^{-1}sec^{-1}$. Thus the atomic Cl rate constant is about four million times higher than $Cl_2$. However, under a typical temperature profile of a coal-fired utility plant, the atomic Cl generated in the combustion zone has already reacted with other flue gas constituents or itself before it could oxidize elemental mercury at required temperatures.

Because halogen reactivity with mercury is a key factor in control, basic research in this area has been conducted by several investigators. Mamani-Paco and Heble (Mamani-Paco, R. M.; Helble, J. J. In *Proceedings of the A&WMA Annual Conf.*; Salt Lake City, AWMA: Pittsburgh, 2000) studied the oxidation of Hg with injected HCl and $Cl_2$ using a quenching system comprising a gradient temperature reaction tube from which samples could be withdrawn for analysis. No oxidation occurred using realistic quench rates with 100 ppm HCl. This is expected: HCl is not an oxidizing agent, since it is already in a highly reduced form. Using a composition containing 50 ppm $Cl_2$ gave only 10% oxidation of $Hg^0$, while very large amounts (500 ppm) of $Cl_2$ gave 92% oxidation. The implication is that the more reactive atomic chlorine was not available in the system. Sliger et al. (Sliger, R. N.; Kramlich, J. C.; Marinov, N. M. *Fuel Process. Technol.* 2000, 65-66, 423) injected HCl and Hg(II) acetate into a natural gas flame and obtained oxidation data consistent with the formation of atomic chlorine and subsequent reaction of a superequilibrium concentration of atomic chlorine with $Hg^0$ at temperatures of 400° to 700° C. Using a very fast (10×) fast quench rate, Niksa reported up to 40% oxidation at 300 ppm Cl (see: Niksa, S.; Fujiwara, N. *Prepr. Pap. Am. Chem. Soc., Div. Fuel Chem.* 2003, 48 (2), 768).

The Energy & Environmental Research Center (EERC) recently demonstrated significant mercury enrichment in ash when HCl was fed into a high-temperature environment followed by a superfast quenching rate of ~5400° C./s (Zhuang, Y.; Thompson, J. S.; Zygarlicke, C. J.; Galbreath, K. C.; Pavlish, J. P. in *Proceeding of Air Quality IV, Mercury, Trace Elements, and Particulate Matter Conference*; Sep. 22-24, 2003). Only 6% of the elemental form was not oxidized and converted to particulate forms. This experiment implies that atomic chlorine generated in the hot zone was still available at lower temperatures, and thus oxidized the mercury at a lower temperature where Hg—Cl reactions are most probable. While in the end most of the mercury was on the ash, it was not clear whether oxidation occurred in the gas phase or solid phase, or where on the solid phase. More recent results from EERC suggest that a significant portion of mercury is oxidized by reactive halogens in a heterogeneous reaction on carbon particulate surfaces. The initial product of the atomic chlorine reaction with Hg is HgCl, which would readily collect on ash, carbon, or sorbent particulates or react with other species or itself.

Further EERC pilot-scale experimental data (Zhuang, Y.; Pavlish, J. H.; Holmes, M. J.; Benson, S. A. Pilot-Scale Study of Advanced Mercury Control Technologies for Lignite-Fired Power Plant in a Retrofit Advanced Hybrid Filter, *Proceedings of the 29th International Technical Conference on Coal Utilization & Fuel Systems*; 2004, Vol. 2, pp 753-764) showed that the reactive halogen species formed at high temperatures can not only significantly enhance mercury oxidation but also improve the reactivity of mercury with activated carbon. The atomic, radical, and/or molecular halogen species that are formed, at least momentarily, in the high-energy environment react at high rates with mercury both as gas-phase and solid-gas interactions. Flue gas-quenching rates also play a role in the mercury-halogen chemistry. A high flue gas-quenching rate will preserve the reactive halogen species formed in the high-temperature zone for ongoing mercury oxidation and gas-to-particle conversion.

Recent bench, pilot, and full-scale experimental data at the EERC demonstrate that halogen species can vastly improve mercury capture kinetics and overall control performance of sorbents. Halogen species are able to improve the reactivity of the sorbent surface; thereby increasing the sorbents ability to remove mercury from the flue gas stream.

Part of the insight of the present invention is that because of high reaction rates, it is difficult to preserve reactive halogen species generated in the furnace so that these forms will be available for reaction with $Hg^0$ at lower temperatures where the resulting mercury compounds will be stable and more easily captured. The present invention reduces the fundamental teachings of the prior art concerning formation, addition, and rapid transfer of atomic, radical, and/or molecular halogen species to a combustion flue gas or product gas from a gasification system into a practical and effective method for mercury control in a utility flue gas stream.

SUMMARY OF THE INVENTION

It is an object of the present invention to provide an apparatus and method for oxidation and removal of mercury in a combustion/gasification flue gas, and/or for the enhancement of mercury sorbent performance.

To effect this purpose, the method utilizes a high-temperature/high-energy process to dissociate halogen-containing materials into atomic halogen forms such as but not limited to $Cl^-$, $Cl_2$, $Br^-$, and $Br_2$, which are very strong mercury oxidants/reactants. To utilize the halogen in highly reactive forms in the reactive portion of the mercury removal process, the dissociated halogen gas is either passed directly into the flue gas stream to oxidize elemental mercury and/or transform gaseous mercury into a particulate-associated form, or alternatively passed into a chamber or duct containing a sorbent (e.g. carbon) that provides a reactive surface for the mercury oxidation and capture, with performance enhanced by the reactive halogens.

The reactive process of the high-energy halogenated gas described herein can be applied at any location downstream of the boiler outlet and/or exit of a gasification system. Preferably the halogenated gas is applied at a location downstream of the boiler outlet wherein the combustion gas has a temperature of between about 100° F. to about 1000° F., and more preferably between about 300° F. to 850° F.

The generated reactive halogens described herein can treat sorbents that are generated in situ either in the halogen dissociation unit or in a separate sorbent generation unit. The halogen-treated sorbent has enhanced reactivity with mercury and improves mercury capture in flue gas thereby requiring less sorbent to optimize mercury removal.

The generated reactive halogens described herein may be used to treat commercially available sorbents such as carbons at any point prior to the injection of the sorbent into the flue gas. In one embodiment of the present invention the sorbent is treated in its feed line just prior to being injected into the flue gas. The halogen-treated carbon has an enhanced reactivity with mercury and improves mercury capture in flue gas.

The high-energy halogen dissociation can be achieved by any heating and/or energy process known to one of ordinary skill in the art, including but not limited to convective, conductive, and radiative heat transfer; microwave, radio frequency (RF); arc; acoustics; combustion, etc.

The halogen-containing materials can be pure elements or chemical (organic or inorganic) compounds, and they can be solid, liquid, and/or gas phases.

Accordingly, the present invention generates the reactive halogens and introduces them into the flue gas stream at any point downstream of the boiler outlet and/or exit of a gasification system to optimize mercury-halogen or mercury-halogen-sorbent interactions while minimizing reaction time with other flue gas components. Alternatively the reactive halogen species can be combined with a carbon sorbent (or other sorbent) to form a reactive sorbent surface for enhanced mercury control.

A unique technique of the present invention for preparation of the treated sorbent (e.g. carbon) is through combining the treatment system with the sorbent injection system at the end-use site. With this technique, the halogen is introduced to the sorbent-air mixture in the transport line (or other part of the sorbent storage and injection system).

Some benefits of the present invention, including those benefits associated with treating sorbents off-site include, but are not limited to:

Capital equipment costs at a treatment facility are reduced or eliminated;

Costs to operate a treatment facility are reduced or eliminated;

There are no costs for transporting sorbent and additive to and from a treatment facility;

The invention may utilize existing hardware and operation procedures;

The invention ensures that the treated sorbent is fresh and, thus, more effective;

The invention allows for transport and handling of less volatile, hazardous, and/or expensive forms of halogens for on-site treatment;

No new handling concerns are introduced;

Special requirements for transport are minimized and/or avoided;

There are no costs for removing carbon from the treatment system;

The inventive process allows rapid on-site tailoring of additive-sorbent ratios in order to match the requirements of flue gas changes, such as may be needed when changing fuels, reducing loads, or otherwise changing operating conditions, thus further optimizing the economics; and The invention reduces the amount of spent sorbents that require disposal.

The invention produces an ash comprising less spent sorbent, thereby increasing the saleability of the ash, since ash with high sorbent concentrations are generally not saleable and reduced to landfill.

The invention reduces potential for corrosion, slagging, and fouling by introducing the halogen after the furnace.

The invention allows for on-site treatment of sorbents using less corrosive and hazardous forms of halogens such as, but not limited to, bromine salts.

With the foregoing and other features in view, there is provided, in accordance with the invention, a process and apparatus for preparing and regenerating carbon sorbents whose activity for mercury capture is promoted by the addition of halogens such as bromine to the carbon structure.

It is to be understood that one of ordinary skill in the art readily understands that the terms combustion gas, flue gas and synthesis gas, as used in this disclosure, refers to any gaseous or gas stream byproduct of a fossil fuel combustion process, and that such terms may be used interchangeably without deviating from the teachings of this disclosure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

As indicated above, the present invention may be used to assist in the removal of mercury contained in the flue gases produced during the combustion of fossil fuels, such as but not limited to coal, used in the production of steam for industrial uses and/or electric power generation. Persons skilled in the art, however, will appreciate that other combustion processes, such as those used in incinerators and the like, may also produce flue gases containing mercury species and the present invention may also be applied to remove the mercury species from the flue gases produced by such equipment and processes. Further, the present invention may also be applied to other "partial oxidation" processes, such as goal gasification processes, which involve the partial oxidation or partial combustion of hydrocarbon feedstocks.

As described in an article titled "How Coal Gasification Power Plants Work", available at the United States Department of Energy website http://fossil.energy.gov/programs/powersystems/gasification/howgasificationworks.html, such partial oxidation processes may be considered not to be a conventional "combustion process" involving the hydrocarbon feedstock [which may still be coal], but rather a complex reaction in which most of the carbon-containing feedstock is chemically broken down under conditions of heat and pressure to produce a synthesis gas or "syngas." Syngas is comprised of hydrogen, carbon monoxide and other gaseous constituents.

Since the hydrocarbon feedstock may contain mercury, the syngas produced by such processes, as well as the flue gases produced during the subsequent combustion of the syngas, may include various mercury species. Accordingly, while the following disclosure may describe the present invention in the context of a typical coal-fired system, such as a coal-fired utility or industrial boiler or steam generator, it will be understood that the present invention may be applied to any type of combustion or partial oxidation process which produces a flue gas or synthesis gas (hereinafter referred to simply as gas) stream from which mercury species are to be removed.

Figure 1:
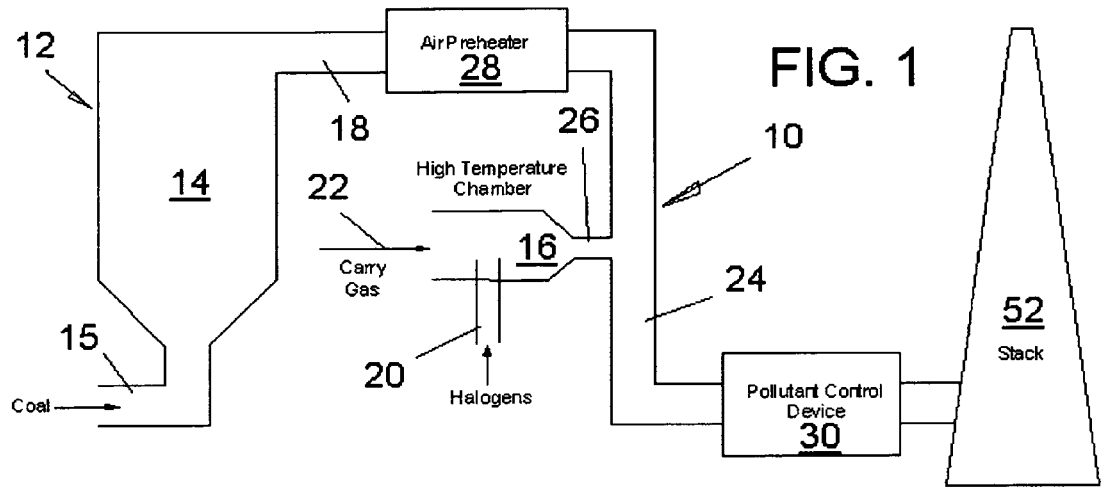
FIG. 1 is a schematic view of a high-energy halogen dissociation system applied in a coal-fired system according to the present invention.

Referring now to the drawings, in which like reference numerals are used to refer to the same or similar elements, FIG. 1 shows a conceptual schematic of a high-energy halogen dissociation system or apparatus 10, applied in a coal-fired system 12. A coal combustor 14 of the coal-fired system can be fired by means of a pulverized coal burner, a Cyclone furnace, or stoker firing, a bubbling bed or circulating fluidized-bed combustor, or any other type of coal combustor used in a coal-fired system or any coal gasification system, generally referred to as a fuel fired system in this disclosure. Fuel is supplied schematically at fuel inlet 15. The dissociation apparatus 10 includes a high-energy halogen dissociation unit 16 installed at any location downstream of an outlet or exit 18 of the coal combustor 14 of the fuel fired system.

The halogen dissociation unit 16 is heated or energized by any available heating means including electric heating, plasma heating, and organic and inorganic compound combustion. The halogen-containing materials enter the dissociation chamber at halogen inlet 20, in any of their physical forms (i.e., gas, liquid, or solid) and are then dissociated into atomic, molecular, and/or radical forms by the addition of heat from the heating means.

The dissociated halogen species are then conveyed by means of a carrier gas supplied at carrier gas inlet 22, into the main gas stream conveyed along flue 24, while halogen quenching can occur either in a passageway 26 connecting the dissociation chamber 16 to the main gas stream in flue 24, or inside the flue 24. The quench rate can be controlled by either any available heat-transfer approaches or heat transfer between the high-energy halogen stream and the gas inside the flue 24. The reactive halogens, preserved by a high quenching rate, will efficiently oxidize elemental mercury vapor in the main gas stream and/or convert gaseous mercury into particulate-associated forms, and/or react with a mercury sorbent material to enhance mercury removal.

Additionally, for mercury oxidation only, the reactive halogen species can again be introduced at any location downstream of the outlet and/or exit 18 of a gasification system.

An air preheater 28 can be provided in the flue 24 at a location upstream of the passageway 26 and one or more pollutant control devices 30 of known construction can be provided downstream of the passageway 26 and upstream of a known stack 52 for discharging the exhaust gases from the system.

Figure 2:
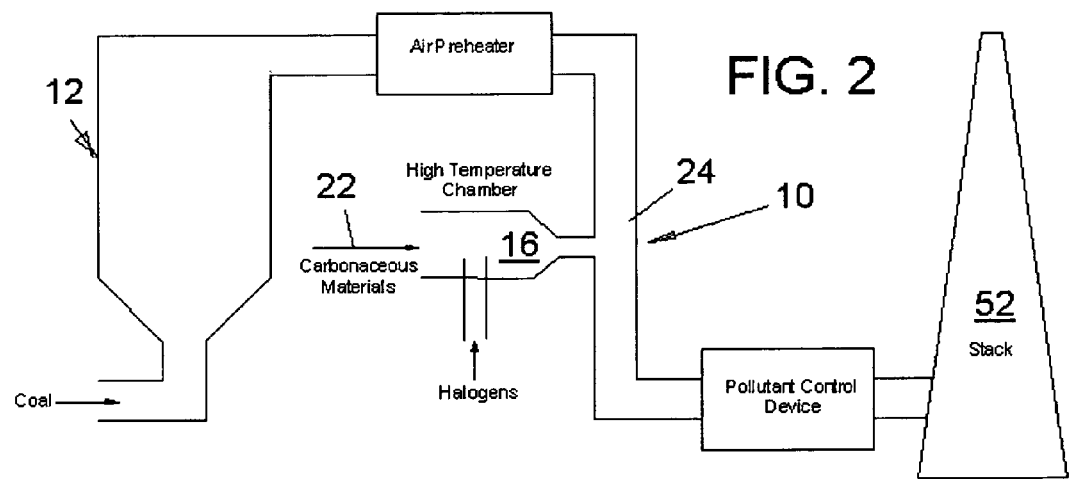
FIGS. 2, 3, 4, 5 and 6 are views similar to FIG. 1 of alternate embodiments of the invention.

FIG. 2 depicts an alternate embodiment of the invention. In this embodiment, carbonaceous precursor materials are also conveyed into the high-energy dissociation chamber 16, e.g. along the carrier gas inlet 22. By controlling the oxygen-to-carbon ratio in the dissociation chamber 16, the carbonaceous material will transform in situ into carbon black, char, or soot. The in situ-generated carbon black, char, or soot will mix with the dissociated halogens, and the halogen-treated carbon black, char, or soot will experience significant quenching and then oxidize and capture gaseous mercury from the gas stream inside the flue 24.

Figure 3:
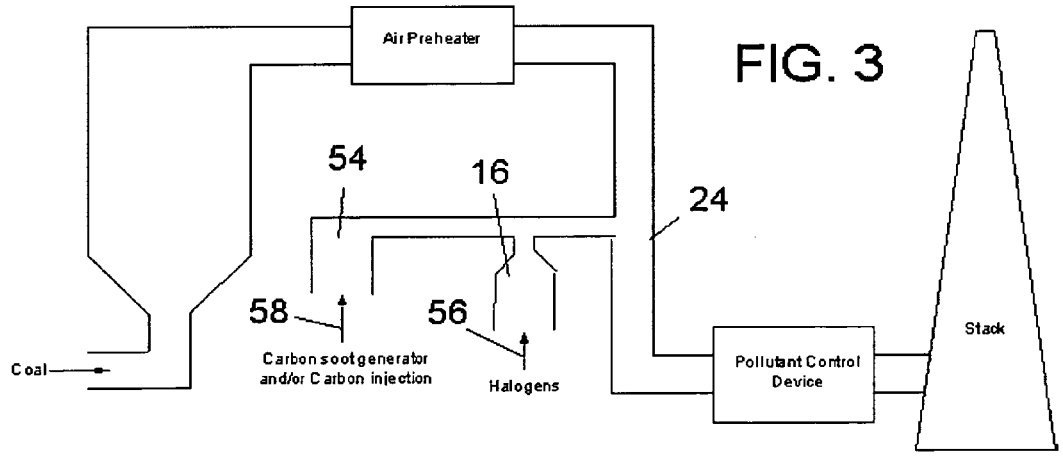

FIG. 3 is yet another alternate configuration of the current invention. In this configuration, carbon black, char, or soot is generated in situ in a separate unit 54 by either a thermal or arc process. The in situ-generated carbon black, char, or soot will be treated by the reactive halogens provided from halogen inlet 56 into chamber 16 during their transit to the main flue 24. This embodiment is also applied to dry prepared sorbent (e.g. activated carbon) injection technologies at carbon inlet 58, as shown in FIG. 3.

Figure 4:
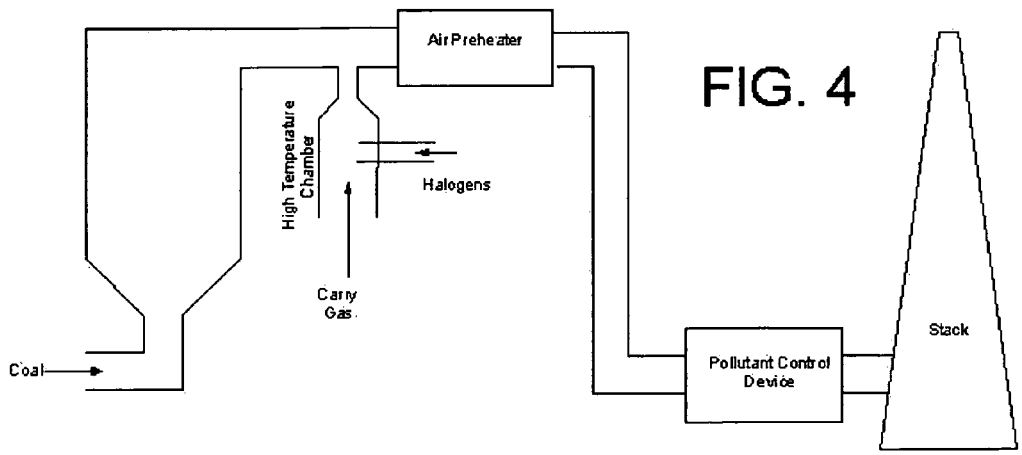
Figure 5:
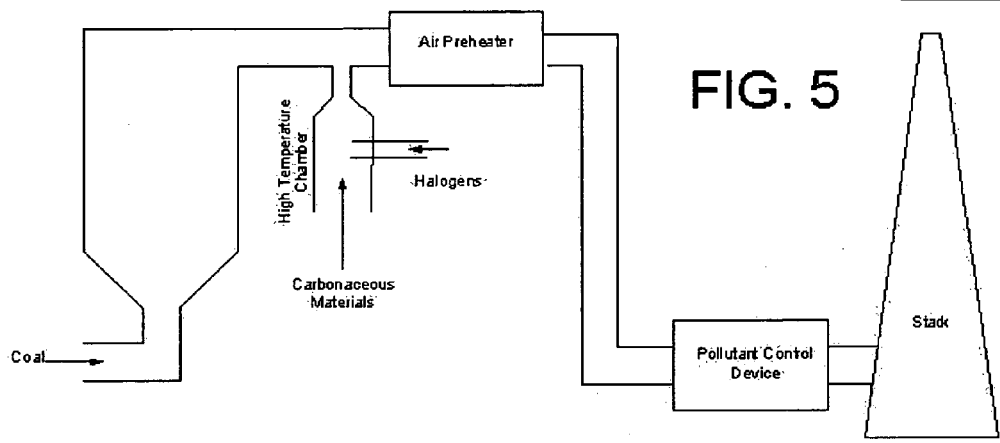
Figure 6:
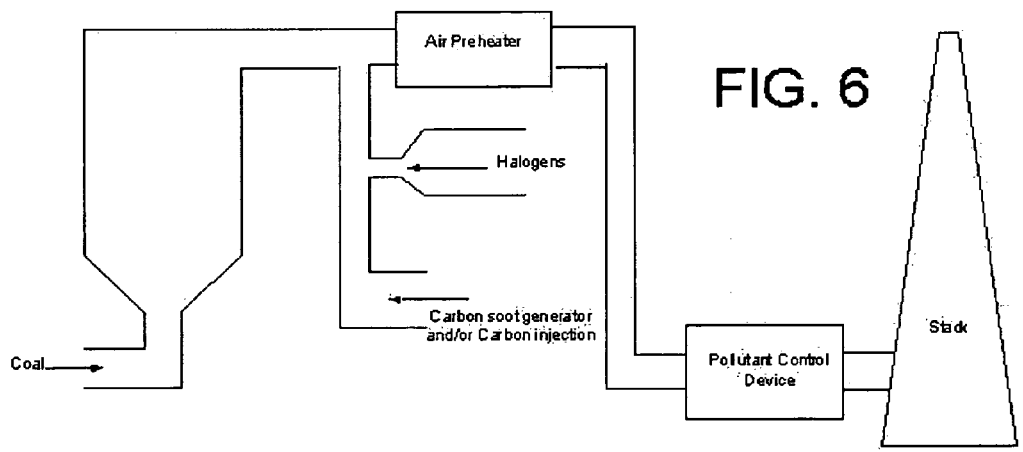

Note that FIGS. 2 and 3 are not meant to imply that the sorbent and carbon materials need to be co-injected at the same point into the flue 24, or that the injection location has to be downstream of the air preheater 28. The technology can be applied at any location downstream of the outlet or exit 18 of the fuel fired system as is illustrated in FIGS. 4, 5, and 6.

In another alternative embodiment, the halogen dissociation may take place in one or more dissociation chambers 16 and the reactive halogens may be subsequently supplied to the gas stream by the carrier gas via one or more passageways 26. In such an embodiment, a sorbent may or may not be supplied to each of the resulting one or more reactive halogen streams being supplied from the dissociation chambers 16 into the gas stream within the flue 24.

In yet another alternative embodiment, an SCR system may be positioned up- or downstream of the carrier gas inlet, wherein the dissociated reactive halogen is provided into the gas stream through the carrier gas inlet. In this embodiment a sorbent may or may not be used.

In still another alternative embodiment, a sorbent bed may be placed downstream of the carrier gas inlet. The bed may be a fixed, moving, fluidized, or other type of sorbent bed commonly known in the art. In an embodiment where a sorbent is injected into the carrier gas stream, the injected sorbent facilitates an additional sorbent bed regeneration role and increases mercury oxidation due to the increased residence time provided through bed suspension.

While the foregoing Figures and description describe the present invention and alternatives thereof as applied to a fuel fired system, it is understood that the present invention may also be utilized in any process producing a mercury containing gas without departing from the teachings of the present invention.

Development and Testing

The EERC has completed a series of tests to verify the present invention and prove the potential of this technology for efficient control of mercury emissions with reduced cost and minor impacts on plant operation.

Figure 7:
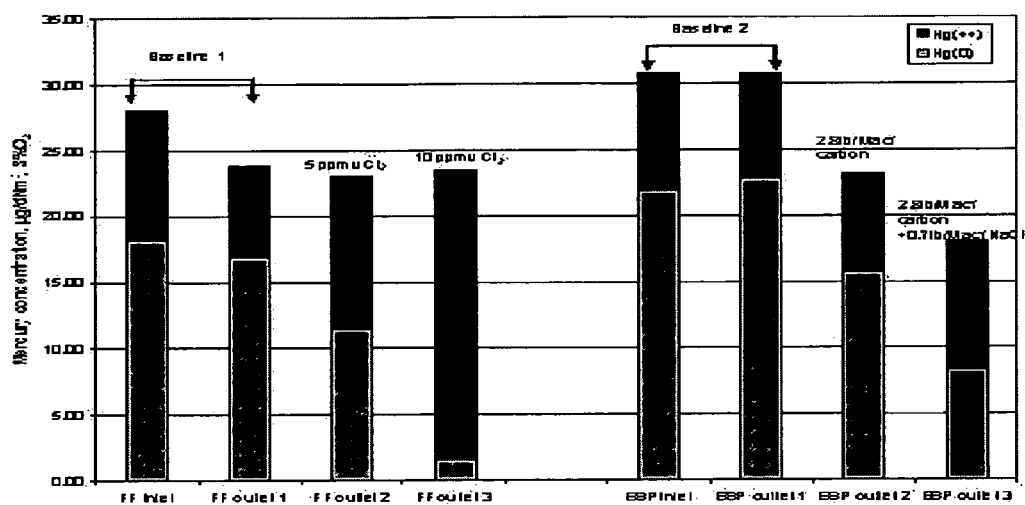
FIG. 7 is a bar chart containing data generated in a pilot-scale combustion test burning Texas lignite.

FIG. 7 contains data generated in a pilot-scale combustion test burning Texas lignite. The flue gas was exhausted through an electrostatic precipitator/fabric filter (ESP/FF) configuration and halogen dissociation tests were completed in both ESP and FF modes to evaluate the effect on mercury oxidation and capture. In the ESP test, both activated carbon and dissociated halogens were injected into flue gas entering the ESP.

FIG. 7 shows dissociated chlorine from a $Cl_2$ precursor added before the FF and dissociated chlorine from a NaCl precursor added before the ESP.

NaCl solution was selected, atomized into aerosol form, and fed into the dissociation chamber. The high-energy-dissociated halogens were introduced into the main flue gas stream, where they contacted the activated carbon, resulting in the oxidation of mercury on the carbon surface. In the baseline test with no dissociated-halogen addition, 2.8 lb/Macf carbon injection into the ESP slightly reduced mercury emissions from 28 (inlet) to 23.2 µg/dNm$^3$ of Hg(g) in the outlet with a very small reduction in elemental to 15.8 µg/dNm$^3$ Hg$^0$. Compared to this small mercury capture across the ESP, by adding dissociated chlorine from 0.7 lb/Macf of NaCl combined with 2.8 lb/Macf carbon injection, the mercury emissions out of the ESP reduced to 18.1 µg/dNm$^3$ of Hg(g) and with 54% of the mercury oxidized.

Another test was completed by injecting a quenched high-energy-dissociated $Cl_2$ gas into the FF (but with no activated carbon injection). Although there was no significant improvement on mercury capture, over 60% of Hg(g) was oxidized with only 5 ppmv quenched high-energy $Cl_2$ injection into the FF, and this increased to over 90% oxidized mercury at the FF outlet with 20 ppmv $Cl_2$ injection. Mercury in Texas lignite flue gas is very difficult to oxidize and capture because of its high mercury and low chlorine contents and the presence of selenium. The current results are encouraging and indicate that quenched high-energy halogens are able to efficiently oxidize mercury and improve mercury control.

Figure 8:
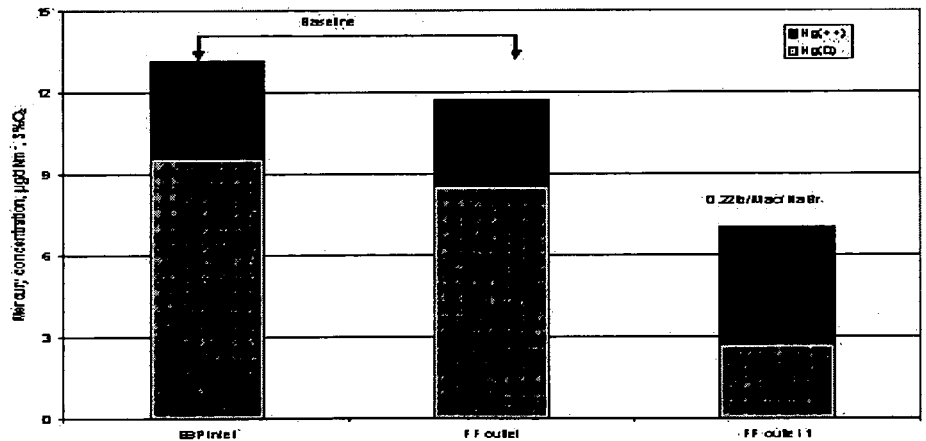
FIG. 8 is a bar chart containing data for dissociated-bromine injection in a subbituminous flue gas in a fabric filter (FF) configuration but without carbon injection.

The invention was also evaluated for dissociated-bromine injection in a subbituminous flue gas in a FF configuration but with no carbon injection. With introduction of dissociated bromine from only 0.22 lb/Macf NaBr into the FF, mercury emissions at the FF outlet reduced to 7.1 µg/dNm$^3$ of Hg(g) with 62% oxidized mercury. See FIG. 8. Compared to the FF mercury emissions of 11.7 µg/dNm$^3$ of Hg(g) with 72.6% Hg$^0$ in the baseline, the current technology again proved its effectiveness on mercury oxidation and control.

The EERC results have demonstrated the potential of this technology for mercury oxidation and control. It can be applied to any fossil fuel-fired system equipped with a pollution control device including but not limited to ESP, FF, wet flue gas desulfurization (WFGD), and spray dryer apparatus.

While a specific embodiment of the invention has been shown and described in detail to illustrate the application of the principles of the invention, it will be understood that the invention may be embodied otherwise without departing from such principles.

What is claimed is:

1. An apparatus for controlling mercury emissions in a gas stream of a fuel fired system comprising: a dissociated halogen formation means for creating a dissociated halogen comprising atomic halogen radicals from a halogen-containing material, and a dissociated halogen supply means connected to the dissociated halogen formation means and the gas stream for supplying the dissociated halogen to the gas stream.

2. An apparatus according to claim 1, wherein the dissociated halogen formation means comprises a high energy chamber with a halogen inlet for supplying halogen-containing material to the high energy chamber, and heating means for heating the chamber to dissociate the halogen-containing material.

3. An apparatus according to claim 2, wherein the dissociated halogen formation means further comprises a carrier gas inlet for supplying carrier gas to the high energy chamber for carrying the dissociated halogen to the gas stream.

4. An apparatus according to claim 3, further comprising a main flue for carrying the gas stream, wherein the main flue is connected to the fuel fired system; an air preheater in the main flue; and a passageway between the high energy chamber and the main flue for providing the dissociated halogen to the main flue, wherein the passageway is connected to the main flue between the fuel fired system and the air preheater.

5. An apparatus according to claim 3, further comprising a main flue for carrying the gas stream, wherein the main flue is connected to the fuel fired system; an air preheater in the main flue; and a passageway between the high energy chamber and the main flue for providing the dissociated halogen to the main flue, wherein the passageway is connected to the main flue downstream of the air preheater.

6. An apparatus according to claim 2, wherein the dissociated halogen formation means further comprises a sorbent inlet for supplying a sorbent to the high energy chamber.

7. An apparatus according to claim 2, further comprising a passageway connected to the gas stream and a sorbent supply means, wherein the high energy chamber is connected to the passageway and the sorbent supply means is connected to the passageway downstream of the high energy chamber.

8. An apparatus according to claim 7, further comprising a main flue for carrying the gas stream, wherein the main flue is connected to the fuel fired system; and an air preheater in the main flue; wherein the passageway is connected to the main flue for providing the dissociated halogen to the main flue, and wherein the passageway is connected to the main flue between the fuel fired system and the air preheater.

9. An apparatus according to claim 8, further comprising a sorbent bed located downstream of the air preheater.

10. An apparatus according to claim 8, further comprising a pollution control device located downstream of the air preheater.

11. An apparatus according to claim 7, further comprising a main flue for carrying the gas stream, wherein the main flue is connected to the fuel fired system: and an air preheater in the main flue: wherein the passageway is connected to the main flue for providing the dissociated halogen to the main flue, and wherein the passageway is connected to the main flue downstream of the air preheater.

12. An apparatus according to claim 11, further comprising a pollution control device located downstream of the air preheater.

13. An apparatus according to claim 11, further comprising a sorbent bed located downstream of the air preheater.

14. A method for controlling mercury emissions in a gas stream of a fuel fired system comprising: dissociating a halogen precursor into dissociated halogen comprising atomic halogen radicals; and supplying the dissociated halogen to the gas stream at a dissociated halogen injection point.

15. A method according to claim 14, further comprising dissociating the halogen in a high energy chamber.

16. A method according to claim 15, further comprising providing a carrier gas, wherein the carrier gas carries the dissociated halogen from the high energy chamber to the gas stream.

17. A method according to claim 16, wherein the carrier gas comprising the dissociated halogen is injected to the gas stream at a pressure higher than that of the gas stream.

18. A method according to claim 16, further comprising supplying a sorbent to the gas stream.

19. A method according to claim 18, further comprising providing a sorbent bed downstream of the dissociated halogen injection point.

20. A method according to claim 18, further comprising providing a passageway connected to the gas stream, and supplying the dissociated halogen and the sorbent to the gas stream via the passageway.

21. A method according to claim 20, wherein the dissociated halogen comprises atomic bromine.

22. A method according to claim 20, wherein the dissociated halogen comprises atomic chlorine.

23. A method according to claim 20, wherein the sorbent is a carbonaceous material.

24. A method according to claim 14, further comprising providing a main flue for carrying the gas stream, wherein the main flue is connected to the fuel fired system; and providing an air preheater in the main flue; wherein the dissociated halogen injection point is a position along the main flue between the fuel fired system and the air preheater.

25. A method according to claim 24, further comprising providing a pollution control device downstream of the air preheater.

26. A method according to claim 14, further comprising providing a main flue for carrying the gas stream, wherein the main flue is connected to the fuel fired system; providing an air preheater in the main flue; and supplying the dissociated halogen and a sorbent to the main flue at the dissociated halogen injection point, wherein the dissociated halogen injection point is positioned along the main flue between the fuel fired system and the air preheater.

27. A method according to claim 26, further comprising providing a sorbent bed downstream of the dissociated halogen injection point.

28. A method according to claim 14, wherein dissociated halogen is introduced to the gas stream at a point where the gas stream is at a temperature below about 1000° F.

29. A method according to claim 28, wherein the dissociated halogen is introduced to the gas stream at a point where the gas stream is at a temperature below about 850° F.

30. A method according to claim 14, further comprising dissociating the halogen in a high energy chamber and injecting the dissociated halogen into the gas stream at one or more dissociated halogen injection points.

31. A method according to claim 30, wherein each of the one or more injection points is fluidly connected to one or more high energy chambers.

32. A method according to claim 31, comprising two or more injection points connected to the same high energy chamber.

33. A method according to claim 30, further comprising providing a sorbent bed downstream of a dissociated halogen injection point.

34. The method of claim 14 wherein supplying the dissociated halogen to the gas stream further comprises a high gas quenching rate, wherein the high gas quenching rate preserves dissociated halogen.

\* \* \* \* \*